Oct. 27, 1959
R. E. SNYDER ET AL
2,910,309
PLURAL CONDUIT SWIVEL COUPLING
Filed July 5, 1956
2 Sheets-Sheet 1
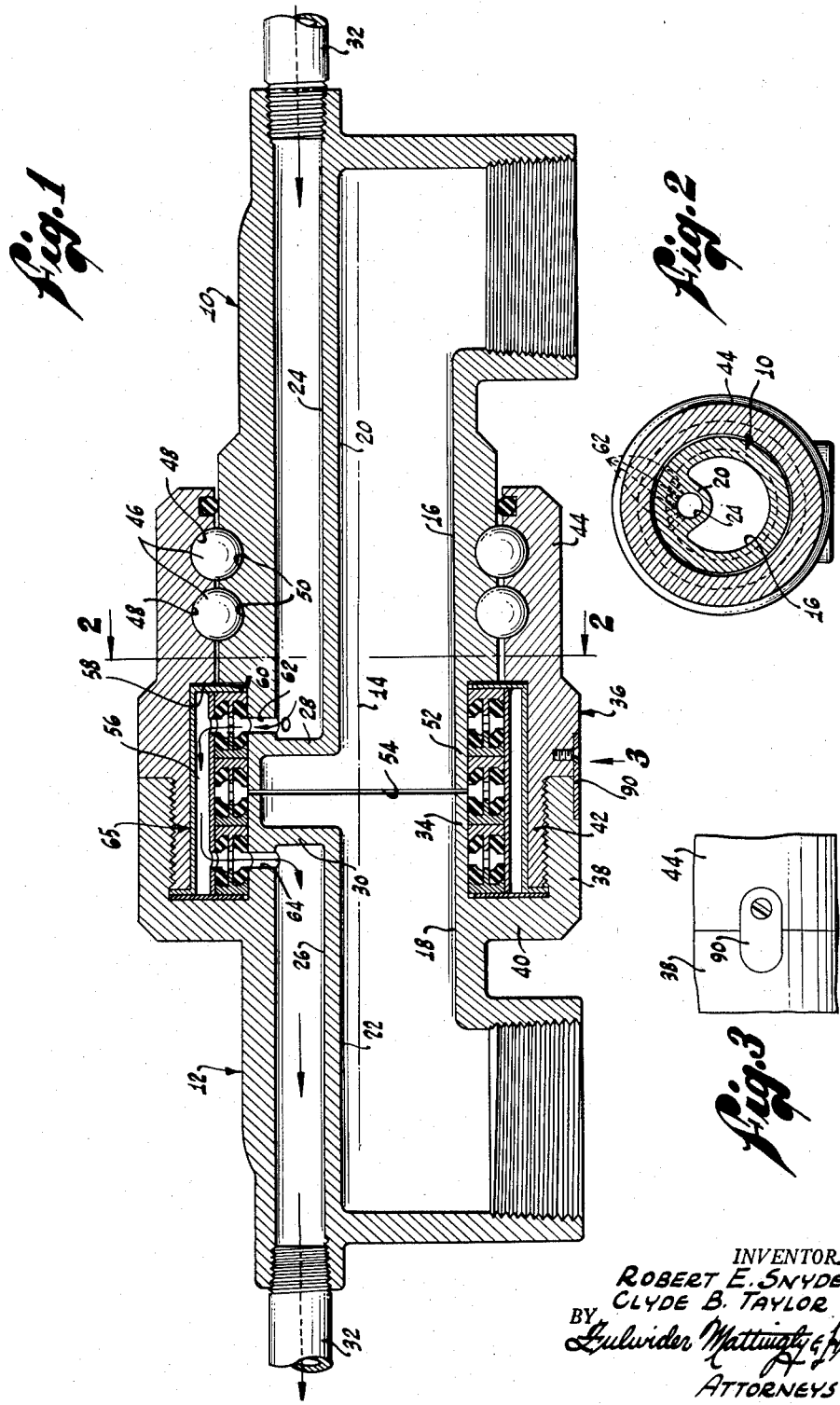
INVENTORS
ROBERT E. SNYDER
CLYDE B. TAYLOR
BY
ATTORNEYS Oct. 27, 1959                R. E. SNYDER ET AL                2,910,309
                        PLURAL CONDUIT SWIVEL COUPLING Filed July 5, 1956                                            2 Sheets-Sheet 2

INVENTORS
ROBERT E. SNYDER
CLYDE B. TAYLOR
BY
ATTORNEYS

United States Patent Office 2,910,309
Patented Oct. 27, 1959

2,910,309

PLURAL CONDUIT SWIVEL COUPLING

Robert E. Snyder, Pasadena, and Clyde B. Taylor, Ontario, Calif., assignors to Chiksan Company, Brea, Calif., a corporation of California Application July 5, 1956, Serial No. 595,881

8 Claims. (Cl. 285—41)

This invention relates to swivel couplings for rotatably connecting fluid conduits and particularly to a swivel coupling of this character having a plurality of separate fluid passages to accommodate the transmission of different fluids through the coupling without intermixing thereof, and capable of 360° swivel movement without interruption of the passages.

One illustrative application of the present coupling is concerned with systems for handling material, such as asphalt, which assumes a liquid or semi-liquid state when heated, but which, when cooled below a given temperature, solidifies or becomes extremely viscous.

In many material handling systems of this nature the material is heated to its liquid state and conveyed from one point to another through fluid conduits. Often adjacent sections of these conduits must be capable of relative swivel or rotary movement. In such cases, fluid-tight swivel couplings are generally connected between the adjacent sections to accommodate such relative swivel or rotary movement.

If the material handling system is continuously operated, the swivel couplings will generally not be prone to maloperation except, of course, as a result of normal wearing or deterioration of the packing in the coupling. Many material handling systems of this character, as, for example, certain types of mobile asphalt handling systems, may be periodically shut down with the result that any material remaining in the conduits or coupling solidifies or becomes excessively viscous.

During operation of the system a certain amount of the liquified material may have leaked into the packing or other parts of the swivel couplings so that upon solidifying of the material by cooling, the coupling becomes fast.

In the past, free rotatability of the swivel coupling parts was re-established, when the system was again placed into operation, by the application of external heat to the couplings, as by a blow torch, or by forcibly freeing the parts. These practices often resulted in damage to the coupling, and especially to the packing therein. To avoid such damage, some system operators relied on the heat from liquified material flowing through the conduits to liquify the solidified material in the coupling and thereby free the latter. This was, however, a time consuming practice, and in some cases resulted in certain inconvenience due to the fact that the material could not be directed to the desired location while the swivel couplings were fast, and the couplings, in turn, could not be released until a certain amount of liquified material had flowed through the conduits.

The plural conduit swivel coupling of this invention is uniquely adapted to such applications since prior to operation of the material handling system, live steam, for example, may be passed through one of the coupling conduits to quickly liquify the solidified material in the coupling and re-establish proper operation thereof.

While the foregoing preliminary discussion has dealt in some detail with one application of the present coupling, it will become apparent as the description proceeds that the invention has general application and may be employed in any system in which it is essential or desired to convey two or more fluids in separate fluid lines through a single swivel connection.

A general object of the invention is the provision of a new and improved plural conduit swivel coupling of the character described.

Another object is the provision of a plural conduit swivel coupling capable of simultaneously conveying several different fluids without intermixing of the latter.

Yet another object is the provision of a plural conduit swivel coupling which is adapted for complete 360° relative rotation of the coupling parts without cutting off or restricting any of the fluid passages through the coupling.

A further object is the provision of a plural conduit swivel coupling embodying a novel cartridge-type packer which performs the dual function of sealing the coupling against leakage and conveying fluid between the relatively rotatable coupling parts, and wherein the packer is removable without disturbing the rotary bearings of the coupling.

Yet a further object is the provision of a novel cartridge-type packer for use in a plural conduit swivel coupling of the class described.

A still further object is the provision of a plural conduit swivel coupling which is relatively simple in construction, inexpensive to manufacture, and otherwise well suited to the purposes for which it is intended.

The above and other objects of the invention are achieved, in the illustrative embodiment thereof, by the provision of rotatably interfitted male and female coupling parts formed with opposing, coaxial, cylindrical end portions and an annular packing recess thereabout. Opposing end faces of these end portions define therebetween an annular interstice between the parts which is sealed against fluid leakage therethrough by an annular, cartridge-type packer encircling the end portions in the packing recess.

A first pair of fluid conduits in the coupling parts communicate in the plane of the interstice to form a first fluid passage through the coupling. Communication between a second pair of fluid conduits in the coupling parts is established through flow spaces in the packer itself to provide a second fluid passage through the coupling. These passages are sealed against leakage therebetween, so as to prevent the intermixing of the fluid flowing therethrough, and the arrangement of the coupling is such that no restriction or cutting off of either passage occurs during swiveling of the coupling parts through a complete 360°.

A better understanding of the invention may be had from the following detailed description taken in conjunction with the annexed drawings wherein:

Figure 1 is a section through a plural conduit swivel coupling construction in accordance with this invention;

Figure 2 is a section, in reduced scale, taken along line 2—2 of Figure 1;

Figure 3 is a view looking in the direction indicated by the arrow 3 in Figure 1;

Figure 4:
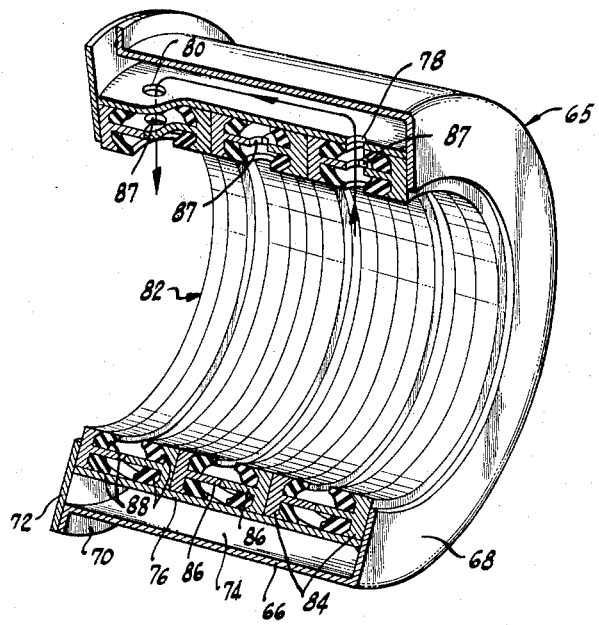
Figure 4 is an enlarged perspective view, partially cut away, of a novel cartridge packer embodied in the coupling of Figure 1.

The swivel coupling illustrated in Figures 1 and 2 comprises generally tubular male and female parts 10 and 12, respectively, which are connected for relative 360° rotation about an axis 14 by bearing means to be described. Formed in the coupling parts are first fluid conduits 16 and 18 which are in communication at their inner ends to form a first fluid passage through the coupling. The outer ends of these conduits are turned 90° to the swivel axis 14 and threaded for connection to fluid lines, not shown.

The cylindrical walls of the coupling parts 10 and 12 are formed with axially extending, thickened sections 20 and 22, respectively, formed therethrough with second fluid conduits 24 and 26. These latter conduits open through the outer ends of their respective coupling parts and are terminally threaded for connection to fluid lines 32. The inner ends of the conduits 24 and 26 are closed by end walls 28 and 30, as shown.

The female part 12 comprises a cylindrical inner end portion 34 defining the inner end of conduit 18, and an enlarged cylindrical sleeve section 36 including an integral, internally threaded sleeve portion 38 concentric with and radially spaced from the end portion 34. Sleeve portion 38 extends from an integral, circumferential shoulder 40 on the female part at the base of its end portion 34. Threadedly engaged in the sleeve portion 38 is the externally reduced end 42 of a sleeve extension 44.

Sleeve extension 44 encircles the inner end of the male part 10 and is rotatably connected to the latter, for full 360° relative rotation of the coupling parts, by a suitable bearing preferably consisting of a double row of antifriction balls 46 engaging in aligned, annular bearing races 48 and 50 in the sleeve extension and male coupling part, respectively. Assembly of the balls 46 in their respective races may be accomplished, in the well known manner, through access openings sealed by removable plugs, not shown, in the sleeve extension 44. An O-ring grease seal may be provided between the sleeve extension and male part where illustrated.

Male coupling part 10 comprises a reduced cylindrical inner end portion 52 coaxial with the cylindrical end portion 34 of the female part, the outer surfaces of which end portions are provided with a relatively smooth finish for reasons to be shortly made clear. The opposing end faces of the end portions 34 and 52 define therebetween an annular interstice 54 between the coupling parts.

Sleeve extension 44 is internally relieved to form with the cylindrical end portions 34 and 52 of the male and female coupling parts, an annular packing recess 56 having the shoulder 40 and annular shoulders 58 and 60 on the sleeve extension 44 and male coupling part, respectively, as end walls thereof. The second fluid conduits 24 and 26 communicate with this packing recess through a series of ports 62 and 64, respectively arranged in the manner shown most clearly in Figure 2.

Positioned in the packing recess 56 is a pre-assembled cartridge-type packer 65 comprising a cartridge case including a rigid cylindrical shell 66 having at one end an internal annular flange 68 defining a central opening of a diameter somewhat greater than the diameter of the end portions 34 and 52. The other end of shell 66 has an out-turned flange 70 seating against the end of sleeve extension 44, and welded or otherwise bonded to this latter flange is a flat annulus 72 the central opening in which is of substantially the same size as the opening in flange 68. Flange 70 and annulus 72 are clamped between shoulder 40 and the end of sleeve extension 44, as shown.

Welded or otherwise bonded at opposite ends to the flange 68 and annulus 72 concentrically within and radially spaced from the shell 66, to define an annular space 74, is a rigid inner cylindrical shell 76. Inner shell 76 is formed with ports 78, 80 approximately in the transverse planes of the ports 62 and 64, respectively.

Contained within the inner shell 76 are packers 82 which are arranged to seal the coupling against leakage through the interstice 54 and to communicate ports 62 and 78 and ports 64 and 80 within the packer cartridge. Various forms of packers 82 may be employed for this purpose. The packers 82, however, preferably comprise T-section packers of the type disclosed in Patent No. 2,384,360, issued September 4, 1945.

Figure 5:
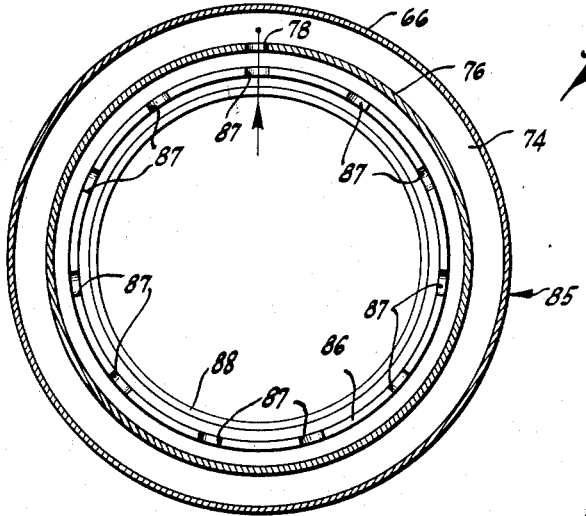
Figure 5 is a section taken in a transverse plane of the cartridge packer of Figure 4.

The illustrated packers are arranged in three groups and comprise rigid T-section backing rings 84, the backing rings of each group having annular flanges 86 thereof, forming the vertical leg of the T section, in abutment and the backing rings of adjacent groups being arranged back to back, as shown. Packer rings 88 seat against the backing rings at opposite sides of the annular flanges 86 of the latter and have annular sealing lips engaging the inner cylindrical surface of the inner cartridge shell 76 and the outer smooth cylindrical surfaces of the end portions 34 and 52 of the coupling parts. The packer rings in each of the groups of packers are axially spaced, and the abutting backing ring flanges are ported, as shown at 87 in Figure 5, so that fluid in the coupling conduits 16 and 18 may flow through the interstice 54 to the packer rings 88 in the center packer group at opposite sides of the adjacent backing ring flanges 86 to urge the sealing lips of the latter packer rings into intimate sealing contact with their respective surfaces.

In the two outer packer groups, the axial spacing between the packer rings 88 and the ports 87 in the abutting flanges of the adjacent backing rings 84 provide flow spaces communicating the ports 62 and 78 and 64 and 80 so that fluid may flow, for instance, from conduit 24, through ports 62, between the adjacent packer rings 88, port 78 in the inner cartridge shell 76, annular space 74 in the cartridge, port 80 in the latter shell, between the packer rings in the left-hand packer group, as viewed in the drawing, and port 64 to conduit 26. The pressure of the fluid flowing between the packer rings in the left and right hand packer groups of the cartridge will act to urge the sealing lips of those rings into intimate sealing engagement with their respective sealing surfaces so as to prevent leakage of the latter fluid from the coupling.

It will be observed that ports 62 and 64 leading from the coupling conduits 24 and 26 communicate with the axial spacings between the opposing packer rings in the right and left hand groups of packers in the cartridge. Since these axial spacings exist around the complete 360° of the rings, the ports 62 and 64, and therefore, the conduits 24 and 26 will communicate, through the annular cartridge space 74, irrespective of the relative angular positioning of the cartridge and the coupling parts. Accordingly, care need not be exercised, in assembling the cartridge in the coupling, to angularly align the cartridge and coupling in some preset manner. A more important advantage of this arrangement is, however, the fact that the coupling conduits 24 and 26 as well as the conduits 16 and 18 remain in communication throughout complete 360° relative rotation of the coupling parts even though the inner end portion of the male part 10, carrying the ports 62, turns inside of the cartridge as occurs during such relative rotation due to the fact that the cartridge is clamped, as previously described, to the female part 12.

Removal of the packer cartridge for repair or replacement, without disturbing bearings 46, may be readily accomplished by unthreading of the extension sleeve 44 from sleeve portion 38. These parts may be secured against accidental loosening in any convenient manner as by a key 90 removably secured to the sleeve extension and fitting in a keyway in the sleeve portion.

It will be apparent from the foregoing description that the present plural conduit swivel coupling is uniquely adapted for use in material handling systems of the character preliminarily discussed. Thus, the larger coupling conduits 16 and 18 may be connected to lines for conveying the liquified material while one of the lines 32, connected to the smaller coupling conduits 24 and 26, may lead to a source of heated fluid such as steam. This heated fluid, on passing through the packer cartridge, will flow in close proximity to the intermediate group of packers in the cartridge. Accordingly, any material which flows into the space between the packer rings of that group through the interstice 54 when the handling system is operating and becomes solidified therein upon subsequent shutting down of the system, with resultant jamming of the coupling, will be quickly heated to its liquid state to free the coupling.

As initially pointed out, however, the illustrative coupling has general application and may be employed to advantage in any system wherein it is desirable or essential to pass two separate fluids through a single swivel coupling without intermixing. Thus, one of the coupling passages may be used to convey a highly combustible liquid, such as gasoline, while the other coupling passage may be connected to a supply of a suitable flame extinguishing material.

Numerous modifications in the design and arrangement of parts of the invention will be immediately apparent to those skilled in the art. For example, other forms of packers than the cartridge packer illustrated may be used in the coupling, and the secondary conduits in the coupling parts may communicate through passages formed, in part, by the coupling parts rather than through a space defined entirely by the packer as illustrated herein. Also, the coupling may have more than two fluid passages and the packer designed to convey a plurality of fluids from one coupling part to the other without intermixing rather than conveying a single fluid as in the case of the illustrative packer. Thus, in the case of three fluid passages through the coupling, the annular space 74 in the packer illustrated would be separated by walls into two separate semi-circular spaces. One set of fluid conduits in the coupling parts will communicate through one of these semi-circular spaces in a manner similar to that in which the conduits 24 and 26 communicate in Figure 1 and an additional group of packer rings will be provided for communicating another of the fluid conduits in the coupling parts with the other semi-circular cartridge space so that all three fluid passages through the coupling remain open for complete 360° relative rotation of the coupling parts.

Numerous other modifications are possible without departing from the spirit and scope of the following claims.

We claim:

1. A plural conduit swivel pipe coupling comprising: generally tubular, rotatably telescoped male and female coupling parts, bearing means connecting said parts for 360° relative rotation and against axial separation, said parts having coaxial cylindrical, inner end portions including opposing inner end faces defining therebetween an interstice between the parts, at least one of the parts being relieved to form an annular recess about said end portions, said parts including first fluid passages open at their outer ends for connection to fluid lines and opening axially through the inner ends of said end portions to form a first fluid conduit through the coupling, said coupling parts including second fluid passages open at their outer ends for connection to fluid lines and having their inner end portions extending axially through the walls of said end portions, the inner ends of said second passages being closed, said end portions having at least one radial opening communicating the inner end of each of said second passages and recess, and packer means in said recess for sealing against fluid leakage between said first conduit and recess through the interstice, said packer means including portions encircling and sealingly engaging said inner end portions and defining circumferential flow spaces about the end portions in the transverse planes of and communicating with said radial openings, and said packer means having passages communicating said flow spaces to form a second fluid conduit through the coupling.

2. A plural conduit swivel pipe coupling comprising: generally tubular male and female coupling parts, bearing means connecting said parts for 360° relative rotation and against axial separation, said parts having coaxial, cylindrical inner end portions including opposing inner end faces defining therebetween an interstice between the parts, at least one of the parts being relieved to form an annular recess about said end portions, said parts including first fluid passages open at their outer ends for connection to fluid lines and opening axially through the inner ends of said end portions to form a first fluid conduit through the coupling, a packer cartridge encircling said end portions within said recess and including a pair of radially spaced, concentric shells, annular end walls on opposite ends of said shells closing the ends of the space between said shells, packer rings in the inner shell encircling said end portions and sealingly engaging the latter and said inner shell at opposite sides of said interstice to seal against fluid leakage between the recess and first conduit through said interstice, additional pairs of packer rings at opposite sides of said first mentioned packer rings sealingly engaging said end portions respectively and the inner shell, the packer rings in each of said additional pair thereof being axially spaced to define a circumferential flow space about the associated end portion, said inner shell having at least two ports communicating said circumferential flow spaces and said space between the shells, and said coupling parts including second fluid passages open at their outer ends for connection to fluid lines and having their inner end portions extending axially through the walls of said end portions, the inner ends of said second passages being closed, and said end portions each having at least one port in the transverse plane of the adjacent circumferential flow space communicating the associated second fluid passage and the adjacent circumferential flow space.

3. The subject matter of claim 2 wherein the packer rings of said additional pair of packer rings comprise T-section packer rings, each ring having an annular flange defining the vertical leg of the T-section, the packer rings of each additional pair being positioned with said flanges thereof in abutment, and said flanges having at least one opening therethrough.

4. A plural conduit swivel pipe coupling comprising rotatably interconnected male and female coupling sections, one of said coupling sections including a cylindrical end portion terminating in an end face disposed in opposed relation to an end face of the other coupling sections with working clearance therebetween, at least one of said coupling sections having therein a recess extending thereinto from its said end face and surrounding said cylindrical end portion, each of said coupling sections having first and second fluid passages therein, said first fluid passages communicating with each other to form a first fluid conduit through the pipe coupling, said second passage of said one coupling section having a radial opening establishing communication between the associated second passage and said recess, and packing means comprising inner and outer cylindrical shells and means rigidly supporting said shells within said recess in coaxial relation with each other to define an annular fluid passage therebetween and to cooperate with said coupling sections in defining a cylindrical seal chamber between the inner shell and said cylindrical end portion, and seal rings disposed within said seal chamber in sealing engagement with said inner shell and with said cylindrical end portion and axially spaced apart to present between the rings a circumferential fluid passage communicating with said radial opening, said inner shell having a port therethrough establishing communication between said circumferential passage and said fluid passage between the shells, said second fluid passage of said other coupling section having an extension communicating with said fluid passage between the shells to complete a second fluid conduit through the coupling.

5. A plural conduit swivel pipe coupling comprising telescopically arranged male and female coupling sections, bearing means interconnecting said sections for relative rotary movement, one of said coupling sections including a cylindrical end portion terminating in an end face disposed in opposed relation to an end face of the other coupling section with working clearance therebetween, at least one of said coupling sections having therein a recess encircling said cylindrical end portion, each of said coupling sections having first and second fluid passages therein, said first fluid passages communicating with each other to form a first fluid conduit through the pipe coupling, said second fluid passage of said one coupling section having a radial opening establishing communication between the associated second passage and said recess, and packing means comprising a shell and means rigidly supporting said shell within said recess in position intersecting the planes of said end faces and spaced radially from both the inner and the outer walls of the recess to separate a seal chamber between the shell and said end portion from an annular fluid passage between the shell and the outer wall of the recess, and seal rings disposed within said seal chamber in sealing engagement with said cylindrical end portion and axially spaced apart to present between the rings a circumferential fluid passage communicating with said radial opening, said shell having a port therethrough establishing communication between said circumferential fluid passage and said fluid passage between the shell and the outer wall of the recess, said second fluid passage of said other coupling section having an extension communicating with said circumferential fluid passage to complete a second fluid conduit through the coupling.

6. A packer for a plural conduit coupling of the class described comprising two spaced, concentric cylindrical shells, said shells defining therebetween an annular axially extending flow passageway, annular end walls closing opposite ends of the flow passageway between the shells in fluid tight relationship, the flow passageway extending uninterruptedly between said end walls, annular packer means within and sealingly engaging the inner surface of the inner shell, said packer means defining a pair of axially spaced flow passageways, said axially spaced flow passageways extending through said packer means and circumferentially therearound and providing the sole means for access of fluid into and through said annular passageway, said inner shell having openings therethrough communicating said axially spaced flow passageways and annular passageway.

7. The subject matter of claim 6 wherein said packer means are formed by pairs of axially spaced packer rings.

8. The subject matter of claim 6 wherein said packer means comprise a series of T-section packer rings in the inner shell having annular flanges forming the vertical leg of the T-section in abutment to define said axially spaced flow passageways, and said abutting flanges having at least one opening therethrough.

References Cited in the file of this patent

UNITED STATES PATENTS

| | | |
|---|---|---|
| 2,063,368 | De La Roza | Dec. 8, 1936 |
| 2,150,529 | Tremolada | Mar. 14, 1939 |
| 2,293,585 | Bard | Aug. 18, 1942 |
| 2,323,179 | Hall | June 29, 1943 |
| 2,445,249 | Sproull | July 13, 1948 |
| 2,451,269 | Allen | Oct. 12, 1948 |
| 2,462,006 | Schmitter | Feb. 15, 1949 |
| 2,546,961 | Amero | Apr. 3, 1951 |
| 2,701,146 | Warren | Feb. 1, 1955 |

FOREIGN PATENTS

| | | |
|---|---|---|
| 658,055 | France | Jan. 22, 1929 |
| 571,910 | Great Britain | Sept. 14, 1945 |